United States Patent
Hirata (10) Patent No.: US 7,938,642 B2
(45) Date of Patent: May 10, 2011

(54) RESIN MOLDING APPARATUS

(75) Inventor: Toru Hirata, Yokosuka (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/512,248

(22) Filed: Jul. 30, 2009

(65) Prior Publication Data

US 2009/0285930 A1 Nov. 19, 2009

Related U.S. Application Data (63) Continuation of application No. 12/226,266, filed as application No. PCT/JP2007/058652 on Apr. 20, 2007.

(30) Foreign Application Priority Data

Apr. 20, 2006 (JP) .................................. 2006-116420

(51) Int. Cl.
*B29C 33/38* (2006.01)

(52) U.S. Cl. .......................... 425/588; 425/810; 249/135

(58) Field of Classification Search .................. 425/552, 425/588, 810; 249/135
See application file for complete search history.

(56) References Cited

U.S. PATENT DOCUMENTS

| | | | |
|---|---|---|---|
| 5,489,410 A * | 2/1996 | Baumgartner et al. | 425/552 |
| 6,030,556 A * | 2/2000 | DePuydt et al. | 425/810 |
| 6,093,013 A | 7/2000 | Sagrati, Jr. et al. | |
| 6,846,445 B2 | 1/2005 | Kim et al. | |
| 2005/0138803 A1* | 6/2005 | Okawa et al. | 425/810 |

FOREIGN PATENT DOCUMENTS

| | | |
|---|---|---|
| EP | 1640132 A1 | 3/2006 |
| JP | 08269648 | 10/1996 |
| JP | 10-149587 | 6/1998 |
| JP | 10149587 A | 6/1998 |
| JP | 11034112 | 2/1999 |
| JP | 2000-322780 | * 11/2000 |

(Continued)

OTHER PUBLICATIONS

Supplementary European Search Report, European Patent Application No. EP07742087, Date of Completion of the Search: Feb. 5, 2010, pp. 1-2.

*Primary Examiner* — Jill L Heitbrink
(74) *Attorney, Agent, or Firm* — Squire, Sanders & Dempsey (US) LLP (57) ABSTRACT

A resin molding apparatus capable of enhancing transfer accuracy, reducing the cost of a molding apparatus, and shortening a molding cycle. The resin molding apparatus includes a first mold; a second mold disposed in opposition to the first mold; a transfer plate (34) attached to one of the first and second molds and comprising a transfer surface bearing a pattern of pits and projections and oriented toward a cavity (C1, C2); and a thermal insulation layer (40) disposed between the transfer plate (34) and the one of the first and second molds and formed through growth from the transfer plate (34) side or from the one of the first and second mold sides. Being disposed between the transfer plate (34) and the one of the first and second molds, the thermal insulation layer (40) can restrain dissipation of thermal energy of a molding material toward the mold. This can restrain formation of a skin layer, which would otherwise result from a sharp drop in temperature of the molding material, whereby transfer accuracy can be enhanced.

5 Claims, 9 Drawing Sheets

FOREIGN PATENT DOCUMENTS

| | | |
|---|---|---|
| JP | 2001-526126 | 12/2001 |
| JP | 2002-361689 | 12/2002 |
| JP | 2006-8759 | 1/2006 |
| WO | 9737348 A1 | 10/1997 |
| WO | 9932269 A1 | 7/1999 |
| WO | 03070444 A2 | 8/2003 |
| WO | 2006043708 A1 | 4/2006 |

* cited by examiner

RESIN MOLDING APPARATUS

CROSS-REFERENCE TO RELATED APPLICATIONS

This is a Continuation of U.S. patent application Ser. No. 12/226,266, which was filed on Oct. 14, 2008. The parent application was a U.S. national stage patent application, based on PCT International Application No. PCT/JP2007/58652, filed on Apr. 20, 2007, claiming priority of Japanese patent application JP 2006-116420, filed on Apr. 20, 2006. The disclosure of the prior applications are hereby incorporated by reference herein in their entirety.

BACKGROUND

1. Field of the Invention

The present invention relates to a resin molding apparatus and a resin molding method.

2. Description of the Related Art

Conventionally, in a molding machine; for example, an injection molding machine, resin is melted within a heating cylinder through application of heat; the thus-molten resin is charged into a cavity of a molding apparatus; and the resin within the cavity is cooled to set, thereby yielding a molded article.

The injection molding machine has a molding apparatus, which serves as a resin molding apparatus; a mold-clamping apparatus; and an injection apparatus. The injection apparatus includes a heating cylinder for melting resin through application of heat; an injection nozzle attached to the front end of the heating cylinder and adapted to inject the molten resin; and a screw disposed within the heating cylinder rotatably and in a manner capable of advancing and retreating. The molding apparatus includes a stationary mold and a movable mold. The mold-clamping apparatus advances and retreats the movable mold, whereby the molding apparatus performs mold closing, mold clamping, and mold opening. When mold clamping is performed, a cavity is formed between the stationary mold and the movable mold.

In a metering step, when the screw is rotated, the resin fed into the heating cylinder is melted and stored ahead of the screw. In the course of this operation, the screw is retreated. In this period, the molding apparatus performs mold closing and mold clamping. Subsequently, in an injection step, the screw is advanced, whereby the resin stored ahead of the screw is ejected from the injection nozzle and is charged into the cavity. Next, in a cooling step, the resin within the cavity is cooled to set. Subsequently, mold opening is performed, and the molded article is ejected.

Figure 1:
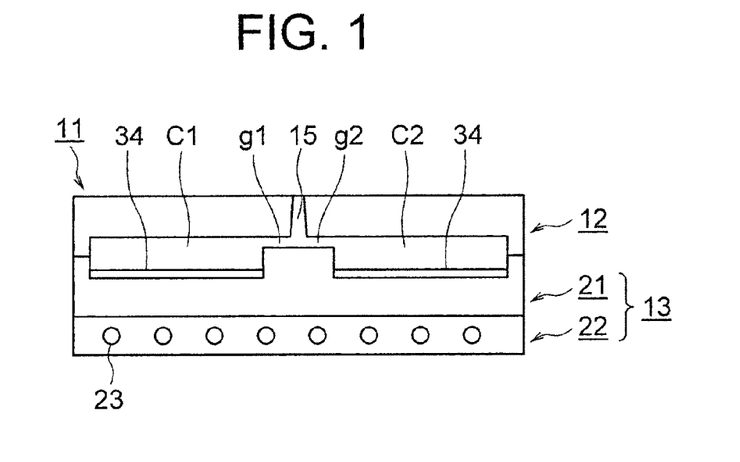
FIG. 1 is a sectional view showing a conventional thermally insulated mold.

FIG. 1 is a sectional view of a conventional molding apparatus.

In FIG. 1, reference numeral 11 denotes a molding apparatus for molding an article, such as a light guide plate; reference numeral 12 denotes a stationary mold; and reference numeral 13 denotes a movable mold disposed in a manner capable of advancing and retreating in relation to the stationary mold 12. By means of an unillustrated mold-clamping apparatus, the movable mold 13 is advanced; i.e., mold closing is performed; the movable mold 13 is brought into contact with the stationary mold 12; i.e., mold clamping is performed, thereby forming cavities C1, C2, each having a rectangular shape, between the stationary mold 12 and the movable mold 13; and the movable mold 13 is retreated from the stationary mold 12; i.e., mold opening is performed.

Reference numeral 15 denotes a sprue formed in the stationary mold 12. Communication is established between the tip end of the sprue 15 and the cavities C1, C2 through gates g1, g2, respectively.

The movable mold 13 includes an upper plate 21 and a lower plate 22, which supports the upper plate 21. A transfer plate 34 is attached to a surface of the movable mold 13 which is located within the cavities C1, C2 and faces the stationary mold 12. The transfer plate 34 has a transfer surface which faces the stationary mold 12 and on which fine pits and projections are formed in a predetermined pattern. Temperature-regulating channels 23 are formed in the lower plate 22. A temperature-regulating medium is run through the temperature-regulating channels 23 so as cool the molding apparatus 11 and resin within the cavities C1, C2.

An unillustrated injection apparatus is disposed in a manner capable of advancing and retreating in relation to the molding apparatus 11. An injection nozzle of the injection apparatus is pressed against the stationary mold 12 of the molding apparatus 11 in a mold-clamped state, and resin is ejected from the injection nozzle. The ejected resin is charged into the cavities C1, C2 through the gates g1, g2, respectively.

The resin in the cavities C1, C2 is cooled, by the temperature-regulating medium, to set. At this time, the pattern of the transfer surface of the transfer plate 34 is transferred onto the resin. Subsequently, mold opening is performed, thereby yielding a light guide plate (refer to, for example, Patent Document 1).

Patent Document 1: Japanese Patent Application Laid-Open (kokai) No. 2000-249538

DISCLOSURE OF THE INVENTION

Problems to be Solved by the Invention

However, in the case where very fine pits and projections are formed on the transfer surface, the conventional molding apparatus 11 may fail to transfer the pattern with a sufficient accuracy, resulting in low transfer accuracy.

A conceivable cause for the above-mentioned problem is as follows: in the case of use of the molding apparatus 11 whose temperature becomes lower than a glass transition temperature of resin, when a molten resin flows into the cavities C1, C2 and comes into contact with wall surfaces of the cavities C1, C2, the molten resin is cooled instantaneously; as a result, a solidified layer; i.e., a skin layer, is formed on the surface of the resin.

The state of formation of the skin layer varies depending on molding conditions for a light guide plate, the type of resin, etc. Generally, time of formation; i.e., time of growth, is said to be on the order of 0.1 second or less, and the thickness of the skin layer is said to be about tens of micrometers. When resin comes into contact with the wall surfaces of the cavities C1, C2, formation of the skin layer hinders the resin from flexibly following the profiles of the wall surfaces in the course of charge of the resin into the cavities C1, C2, resulting in occurrence of a molding defect, such as a weld, defective transfer, or the like. In the case where very fine pits and projections are formed on the transfer surface as mentioned above, the pattern fails to be transferred onto the resin with a sufficient accuracy, resulting in low transfer accuracy.

According to a conceivable measure to cope with the above-mentioned problem, in order to finish transfer before formation of the skin layer, the temperature of the molding apparatus 11 is raised for increasing fluidity of resin. However, increasing the temperature of the molding apparatus 11 elongates time required for cooling resin to a corresponding extent, thereby elongating a molding cycle. According to another conceivable measure, a temperature-regulating mechanism is disposed within the molding apparatus 11 for regulating the temperature of the molding apparatus 11. However, this not only increases the cost of the molding apparatus 11 but also consumes a large amount of energy for regulating the temperature of the molding apparatus 11, resulting in an increase in the cost of a light guide plate.

Further, according to a conceivable method for enhancing transfer accuracy, the pressure within the cavities C1, C2 is increased so as to mechanically crush the skin layer for establishing plastic deformation. However, this not only increases the size of the mold-clamping apparatus but also deteriorates the pattern on the transfer plate 34, thereby impairing the durability of the transfer plate 34.

An object of the present invention is to solve the above-mentioned problems in the conventional molding apparatus 11 and to provide a resin molding apparatus and a resin molding method which can enhance transfer accuracy, reduce the cost of a molding apparatus, and shorten a molding cycle.

Means for Solving the Problems

To achieve the above-mentioned object, a resin molding apparatus of the present invention comprises a first mold; a second mold disposed in opposition to the first mold; a transfer plate attached to one of the first and second molds and comprising a transfer surface bearing a pattern of pits and projections and oriented toward a cavity; and a thermal insulation layer disposed between the transfer plate and the one of the first and second molds and formed through growth from the transfer plate side or from the one of the first and second mold sides.

EFFECTS OF THE INVENTION

According to the present invention, the resin molding apparatus comprises a first mold; a second mold disposed in opposition to the first mold; a transfer plate attached to one of the first and second molds and comprising a transfer surface bearing a pattern of pits and projections and oriented toward a cavity; and a thermal insulation layer disposed between the transfer plate and the one of the first and second molds and formed through growth from the transfer plate side or from the one of the first and second mold sides.

In this case, being disposed between the transfer plate and the one of the first and second molds, the thermal insulation layer can restrain conduction of thermal energy of a molding material toward the mold. This can restrain formation of a skin layer, which would otherwise result from a sharp drop in temperature of the molding material. As a result, transfer accuracy can be enhanced.

Since a mold-clamping force for plastically deforming the skin layer can be reduced, not only can the size of an injection molding machine be reduced, but also the durability of the transfer plate can be enhanced.

Since the temperature of the resin molding apparatus can be set low to an extent corresponding to the enhancement of transfer accuracy, the transfer plate and the one of the first and second molds can lower temperature more quickly. Therefore, a molding cycle can be sufficiently shortened.

DESCRIPTION OF REFERENCE NUMERALS 20, 61: molding apparatus
24A: stationary mold
24B: movable mold
34: transfer plate
40: thermal insulation layer
C, C1, C2: cavity

BEST MODE FOR CARRYING OUT THE INVENTION

Embodiments of the present invention will next be described in detail with reference to the drawings. In this case, an injection molding machine, which serves as a molding machine, and a molding apparatus, which serves as a resin molding apparatus, will be described.

Figure 2:
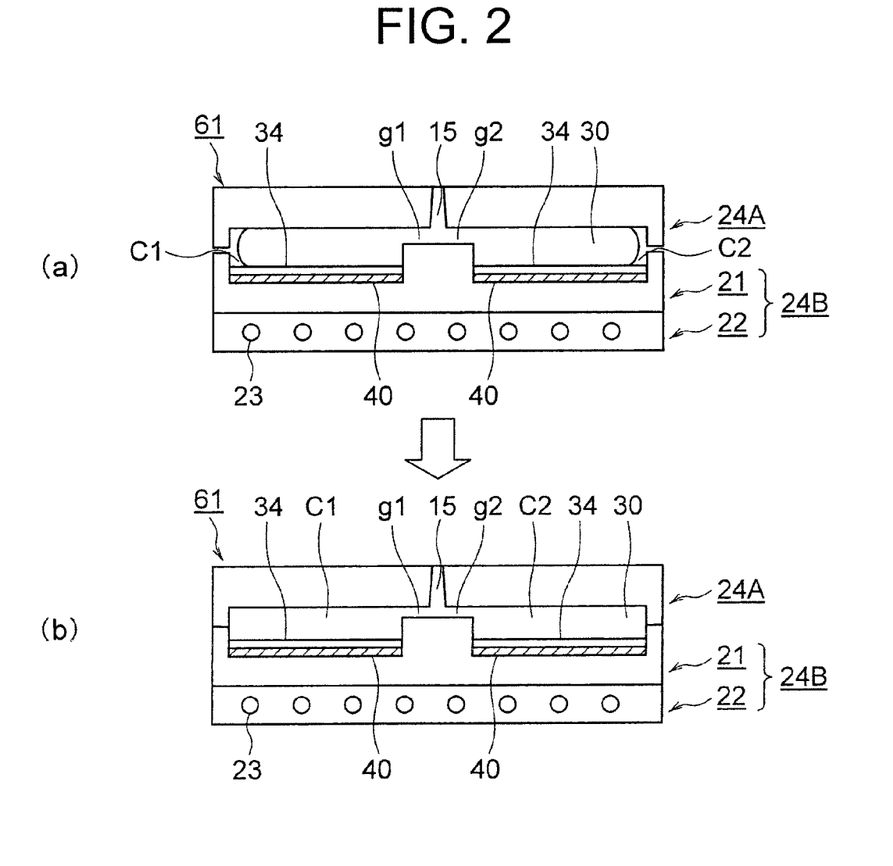
FIG. 2 is a pair of sectional views showing a resin molding method in a first embodiment of the present invention.

FIG. 2 is a pair of sectional views showing a resin molding method in a first embodiment of the present invention, wherein (a) is a view showing a state in which a resin 30, which serves as a molding material, is charged into cavities C1, C2, and (b) is a view showing a state in which mold clamping has been performed.

In FIG. 2, reference numeral 61 denotes a molding apparatus, which serves as a resin molding apparatus for molding an article, such as a light guide plate; reference numeral 24A denotes a stationary mold, which serves as a first mold member and as a first mold; and reference numeral 24B denotes a movable mold, which serves as a second mold member and as a second mold, disposed in a manner capable of advancing and retreating in relation to the stationary mold 24A. By means of an unillustrated mold-clamping apparatus, the movable mold 24B is advanced; i.e., mold closing is performed; the movable mold 24B is brought into contact with the stationary mold 24A; i.e., mold clamping is performed, thereby forming cavities C1, C2, each having a rectangular shape, between the stationary mold 24A and the movable mold 24B;

and the movable mold 24B is retreated from the stationary mold 24A; i.e., mold opening is performed.

Reference numeral 15 denotes a sprue formed in the stationary mold 24A. Communication is established between the tip end of the sprue 15 and the cavities C1, C2 through gates g1, g2, respectively.

The movable mold 24B includes an upper plate 21 and a lower plate (backing plate) 22, which supports the upper plate 21. A thermal insulation layer 40 is formed on a surface of the movable mold 24B which is located within the cavities C1, C2 and faces the stationary mold 24A. A transfer plate 34 is attached to a surface of the thermal insulation layer 40 which faces the stationary mold 24A. The transfer plate 34 has a transfer surface which faces the stationary mold 24A and on which fine pits and projections are formed in a predetermined pattern.

Temperature-regulating channels 23 are formed in the lower plate 22. A temperature-regulating medium; for example, water, is run through the temperature-regulating channels 23 so as to cool the molding apparatus 61 and resin 30 within the cavities C1, C2. Temperature-regulating channels similar to the temperature-regulating channels 23 can also be formed in the stationary mold 24A for running water therethrough.

An unillustrated injection apparatus is disposed in a manner capable of advancing and retreating in relation to the molding apparatus 61. An injection nozzle of the injection apparatus is pressed against the stationary mold 24A of the molding apparatus 61 in a mold-clamped state, and the resin 30 is ejected from the injection nozzle. The ejected resin 30 is charged into the cavities C1, C2 through the gates g1, g2, respectively.

The resin 30 in the cavities C1, C2 is cooled, by the above-mentioned water, to set. At this time, the pattern on the transfer surface of the transfer plate 34 is transferred onto the resin 30. Subsequently, mold opening is performed, thereby yielding a light guide plate.

The present embodiment uses the stationary mold 24A as the first mold, and the movable mold 24B as the second mold. While the movable mold is disposed above the stationary mold, the movable mold can be advanced and retreated by a press mechanism. In this case, the stationary mold is used as a stationary lower mold, and the movable mold is used as a movable upper mold.

In the present embodiment, the temperature of the above-mentioned water is regulated such that the temperature of the molding apparatus 61 as measured when molding is started is set a predetermined value; specifically, about 40° C., lower than the temperature of the conventional molding apparatus 11.

For establishing the above-mentioned temperature condition, the thermal insulation layer 40 is formed on the movable mold 24B as mentioned previously.

Figure 3:
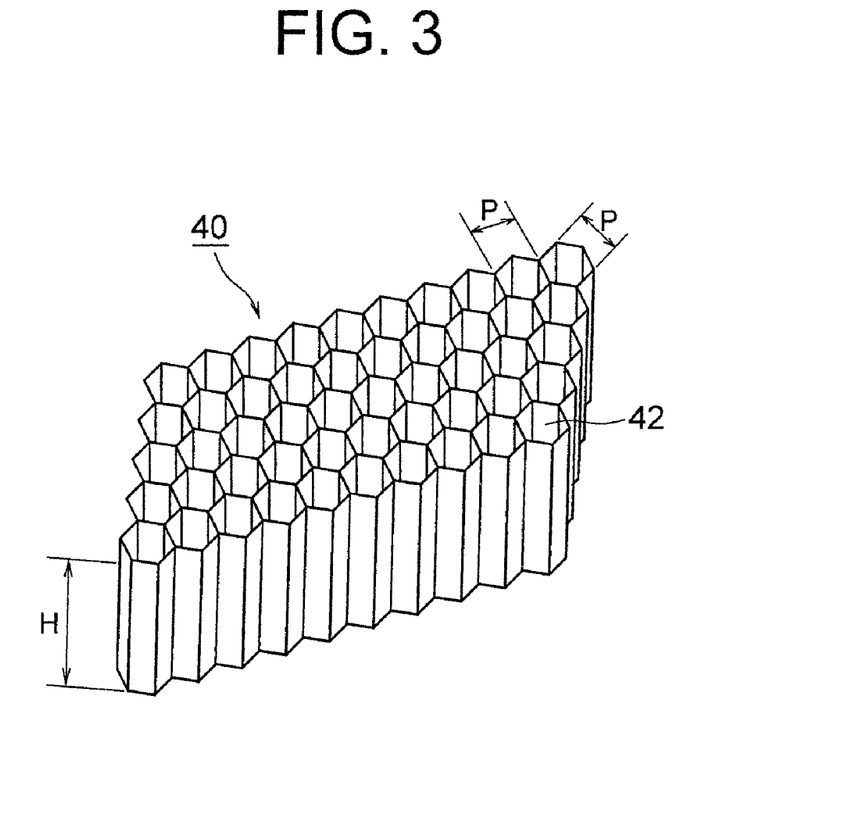
FIG. 3 is a perspective view showing a main portion of a thermal insulation layer in the first embodiment of the present invention.
Figure 4:
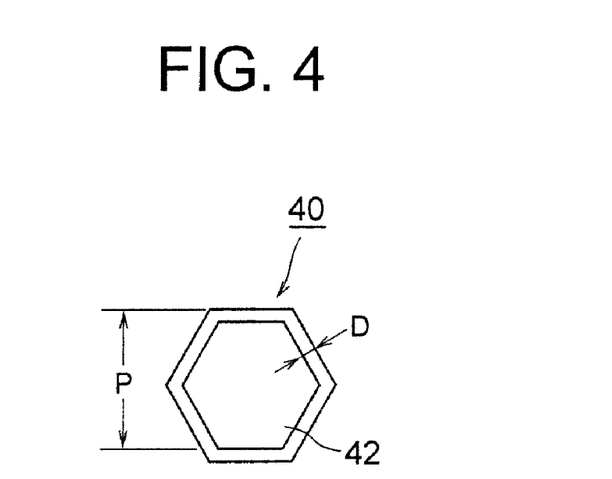
FIG. 4 is an enlarged view showing the main portion of the thermal insulation layer in the first embodiment of the present invention.

FIG. 3 is a perspective view showing a main portion of the thermal insulation layer in the first embodiment of the present invention. FIG. 4 is an enlarged view showing the main portion of the thermal insulation layer in the first embodiment of the present invention.

The thermal insulation layer 40 has a honeycomb structure whose cells each have the shape of a regular polygon; in the present embodiment, a regular hexagon, in section.

Meanwhile, in the case where a polymeric material, for example, is disposed between the transfer plate 34 and the upper plate 21 for use as a thermal insulation layer, in the course of actual molding, contractions associated with heat cycles cause the thermal insulation layer to rub against the surface of the transfer plate 34; consequently, the transfer plate 34 wears. In the case of molding of light guide plates mentioned previously, the molding apparatus 61 is required to have a durability of 1,000,000 or more shots. The thermal conductivity of a polymeric material is about two orders of magnitude lower than that of a steel material used to form the molding apparatus 61. Therefore, a polymeric material is an optimum material for the thermal insulation layer in terms of thermal conductivity, but remains an unsatisfactory material for the thermal insulation layer in terms of durability.

According to another conceivable method, the thermal insulation layer is formed from a ceramic material, such as zirconia, by a film formation process. Since zirconia has a coefficient of linear expansion close to that of a steel material, use of zirconia is less likely to raise the problem of rubbing caused by contractions associated with heat cycles, as compared with the case of use of the polymeric material. However, since the thermal insulation performance of zirconia is low, in order to exhibit the thermal insulation effect intended by the present invention, the thermal insulation layer of zirconia may need to have a thickness of about 100 μm to about 1 mm. In this case, even when the thermal insulation layer can be actually formed, the formed thermal insulation layer is of a highly fragile structure. Therefore, contractions associated with heat cycles and the application of a large injection force, a mold-clamping force, or the like cause cracking of the thermal insulation layer. As a result, the durability of the thermal insulation layer drops.

Thus, in the present embodiment, the thermal insulation layer 40 is formed into a honeycomb structure whose cells each have the shape of a regular hexagon in section as mentioned previously.

Meanwhile, in the case of molding of an optical medium, such as a light guide plate, for example, a pressure of up to about 300 kg/cm² may be applied to a circular region having a diameter of 12 cm. The transfer plate 34 to be used in molding is usually formed by nickel electroforming. The present embodiment also uses the transfer plate 34 formed by nickel electroforming. The transfer plate 34 has a thickness of about 0.3 mm. A pattern of fine pits and projections each having a submicron size is formed on the surface of the transfer plate 34.

The transfer plate 34 is attached to the surface of the upper plate 21 mechanically or by air chuck. In order to mitigate rubbing caused by contractions associated with heat cycles, the surface of the upper plate 21 is coated with a highly wear-resistant material, such as DLC (Diamond Like Carbon); thus, a DLC film is formed. In this case, since polishing the surface of the film is impossible, the surface of the film has a certain roughness. Also, voids each having a diameter of tens of micrometers to 100 micrometers may be generated.

In order to avoid transfer of the shapes of voids onto the surface of a light guide plate through the thin transfer plate 34 with a resultant formation of associated marks on the surface of the light guide plate, the aforementioned honeycomb structure is employed. The honeycomb pitch P of the honeycomb structure is 0.1 μm to 100 μm inclusive, preferably 1 μm to 10 μm inclusive. This range is determined in consideration of the disposition of the thermal insulation layer 40 between the movable mold 24B and the transfer plate 34. Generally, the honeycomb pitch P is set far smaller than that of a honeycomb structure formed within the molding apparatus 11 for the purpose of thermal insulation.

Metal is used to form the honeycomb structure of the thermal insulation layer 40. The thickness of a wall of the honeycomb structure; i.e., a wall thickness D, is set to 0.01 μm to 10 μm inclusive, preferably 0.1 μm to 5 μm inclusive. This range is determined for the following reason: assuming that, for example, void portions 42 of the honeycomb structure are filled with air, whose thermal conductivity is negligibly low as compared with that of a steel material, in order for the thermal insulation layer 40 to exhibit about one-tenth the thermal conductivity of a steel material, the percentage of the void portions 42; i.e., porosity, must be 90%. A honeycomb height H indicative of the height (formation height) of the honeycomb structure is set to 10 μm to 10 mm inclusive.

Assuming that, the honeycomb pitch P is, for example, 10 μm, the wall thickness D of the honeycomb structure is on the order of 1 μm or less. In forming a microhoneycomb structure having, for example, a wall thickness D of 1 μm, a honeycomb pitch P of 10 μm, and a honeycomb height H of 1 mm over a large area of ten-odd cm, use of a fabrication method based on so-called LIGA (Lithographie, Galvanoformung, Abformung) process is preferred, since such a method is superior in forming a structure whose ratio of height to area is high; i.e., a "high-aspect-ratio structure." Since the LIGA process itself is well known, detailed description thereof is omitted. Briefly, the LIGA process is carried out as follows: an X-ray-sensitive resist material is applied, in the form of a thick film, onto a substrate; the film is exposed to synchrotron radiation (SR) (X-ray exposure) via an X-ray mask which uses Au, Be, or the like as an absorber; and exposed portions or masked portions of the film are developed and removed, thereby yielding a resist microstructure.

The resist microstructure is subjected to electroforming, thereby forming a replica. A honeycomb structure can be formed by injection molding or the like using the replica.

In the case where an LIGA process is employed, conceivable embodiments are as follows: an embodiment in which a honeycomb structure is formed on a surface of the transfer plate 34 which faces the movable mold 24B, and an embodiment in which a honeycomb structure is formed on a surface of the movable mold 24B which faces the transfer plate 34.

Next, a method for forming a honeycomb structure will be described.

Figure 5:
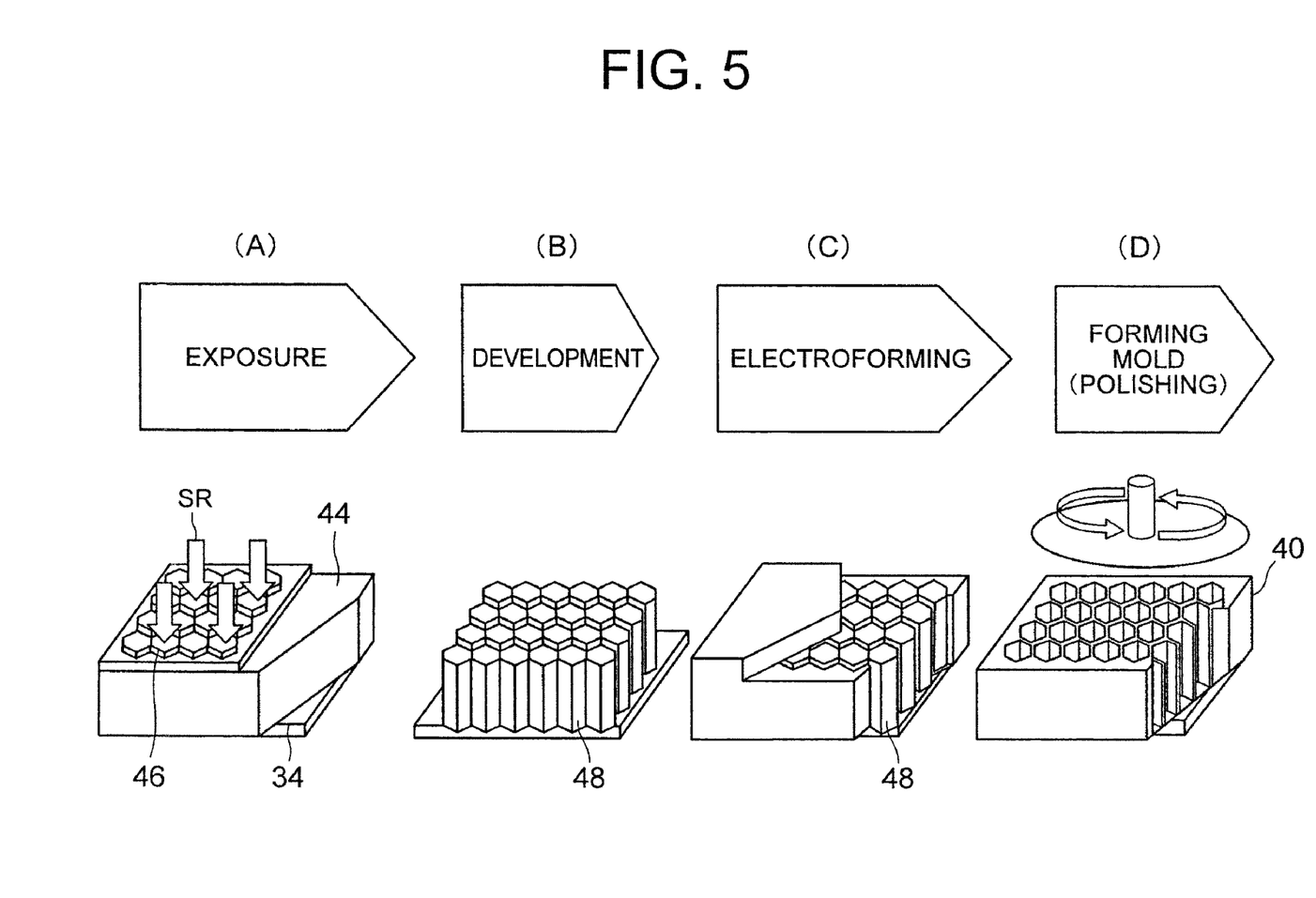
FIG. 5 is a series of views showing a first method for forming a honeycomb structure in the first embodiment of the present invention.
Figure 6:
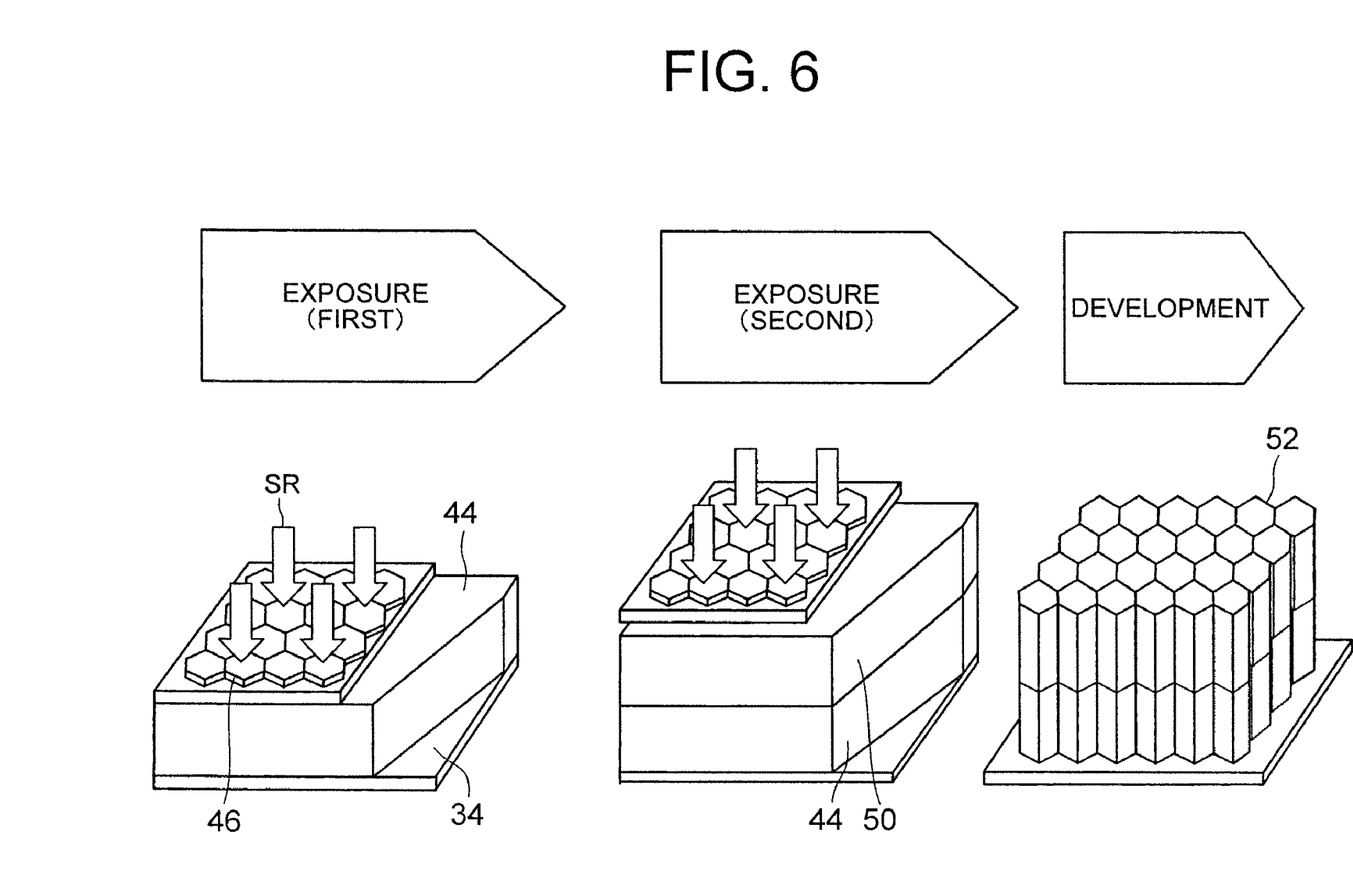
FIG. 6 is a series of views showing a second method for forming a honeycomb structure in the first embodiment of the present invention.

FIG. 5 is a series of views showing a first method for forming a honeycomb structure in the first embodiment of the present invention. FIG. 6 is a series of views showing a second method for forming a honeycomb structure in the first embodiment of the present invention.

A honeycomb structure is formed on the surface of the transfer plate 34 which faces the movable mold 24B as follows. As shown in FIG. 5, while the transfer plate 34 (made of nickel) is used as a substrate, an X-ray-sensitive resist material 44 is applied, in the form of a thick film, onto the back surface (a surface which faces the movable mold 24B) of the transfer plate 34 (alternatively, a film of the resist material 44 is affixed). The thickness of the resist material 44 is adjusted to a predetermined value by polishing or the like. The resist material 44 is exposed to synchrotron radiation (SR) via an X-ray mask 46, and then development is carried out, thereby yielding a negative honeycomb structure 48 having a structure width of 1 μm corresponding to the wall thickness D, and a repetition cycle of 10 μm corresponding to the honeycomb pitch P (FIGS. 5(A), 5(B)). Subsequently, nickel electroforming is carried out to grow a honeycomb structure (FIG. 5(C)). At this time, the transfer surface (the lower surface in FIG. 5) of the transfer plate 34 is protected with an appropriate material, such as resist. After nickel electroforming, the honeycomb height is adjusted by polishing or the like, thereby yielding the thermal insulation layer 40 joined to the transfer plate 34 (FIG. 5(D)).

Usually, the thickness of the resist material 44 to be irradiated by a single X-ray exposure is on the order of hundreds of micrometers. Therefore, when a far thicker thermal insulation layer 40 is to be formed, another honeycomb structure must be additionally formed on the previously formed honeycomb structure. This can be carried out by, for example, a multiple-exposure LIGA process. Specifically, as shown in FIG. 6, after completion of the first exposure, development is not carried out immediately, but the second layer of a resist material 50 may be formed on the first layer of the resist material 44. Since the honeycomb structure of the first layer eliminates the risk of transfer of a honeycomb pattern (a pattern of honeycomb structure) onto a light guide plate through the transfer plate 34, the honeycomb pitch P of the honeycomb structure of the second layer can be rendered greater than that (e.g., 10 μm) of the honeycomb structure of the first layer. When a required thickness of a microstructure of the resist material is obtained through repetition of similar exposure, development is performed collectively. In this manner, a negative honeycomb structure 52 of multiple honeycombs can be formed. The negative honeycomb structure 52 is subjected to nickel electroforming. Finally, the resist layers 44, 50 are removed, thereby yielding the thermal insulation layer 40 having a nickel honeycomb structure of a required thickness.

Meanwhile, in the case of forming a honeycomb structure on the surface of the movable mold 24B which faces the transfer plate 34, basically, the same method as that employed for forming a honeycomb structure by nickel electroforming described above can be used. However, since a steel material cannot be grown by electroforming, preferably, a metal-powder forming technique is used in place of electroforming, such as nickel electroforming. In this case, a procedure up to the step of forming the negative honeycomb structures 48, 52 remains the same. The subsequent step uses a metal-powder sinter forming technique in place of electroforming. In this case, a metal powder of the same material (steel material) as that of the molding apparatus 61 is used for restraining generation of thermal stress between the thermal insulation layer 40 and the movable mold 24B, which could otherwise result from a difference in thermal expansion coefficient.

At the time of sintering, volume contracts by several percent to 10-odd percent, depending on the composition. Thus, sintering is performed so as to form a mold component on which wall portions of the cavities C1, C2 are integrally formed. In a subsequent step, the resultant component must undergo cutting for later attachment thereof through fitting as a chase which partially constitutes the molding apparatus 61.

Next, the operation of the molding apparatus 61 having the above-mentioned configuration will be described.

Figure 7:
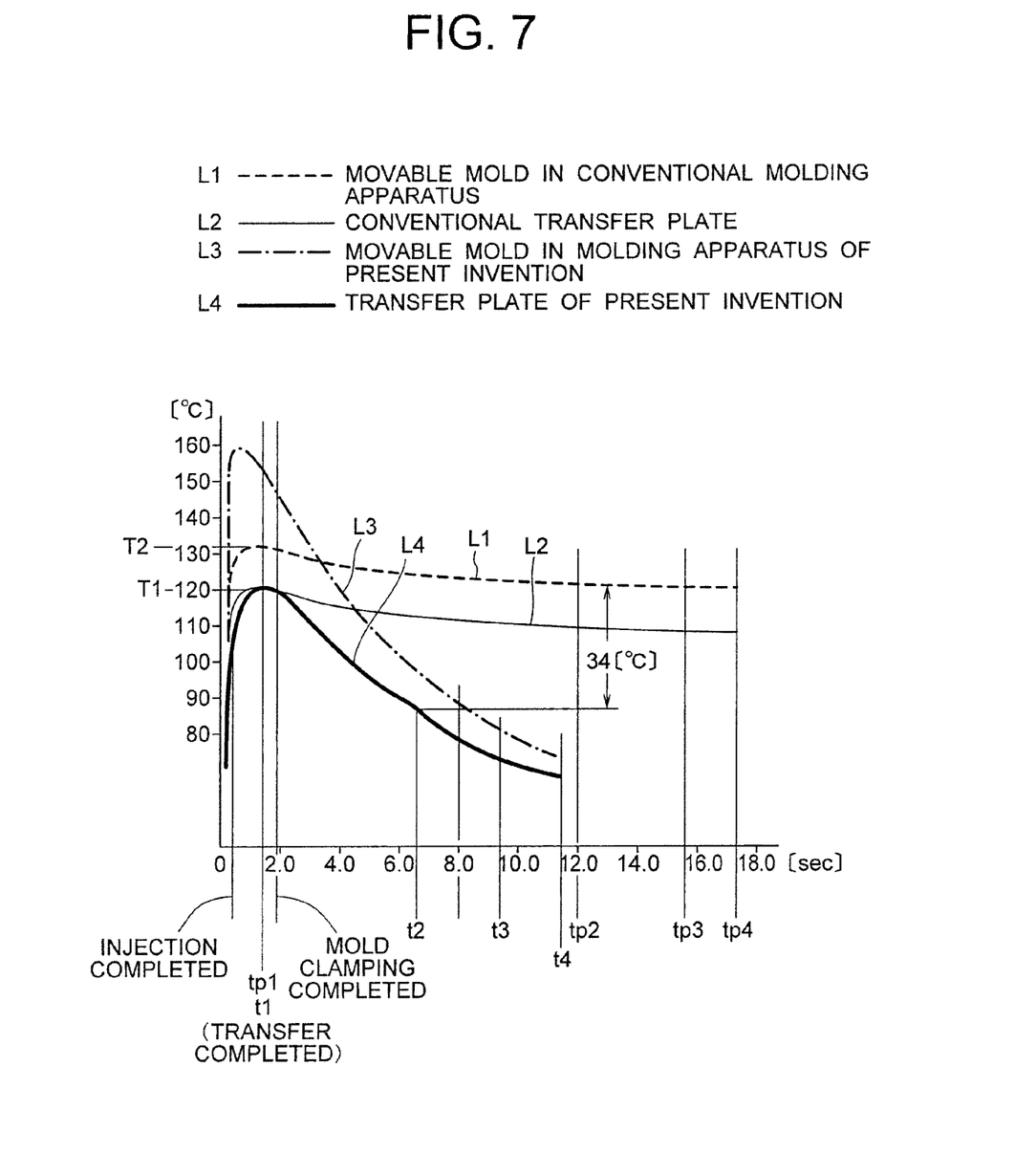
FIG. 7 is a graph showing characteristics of a molding apparatus in the first embodiment of the present invention.

FIG. 7 is a graph showing characteristics of a molding apparatus in the first embodiment of the present invention. In FIG. 7, time is plotted along the horizontal axis, and the temperature of the molding apparatus 61 is plotted along the vertical axis.

In FIG. 7, line L1 indicates the temperature of the movable mold 13 in forming a light guide plate by use of the conventional molding apparatus 11; line L2 indicates the temperature of the transfer plate 34 in forming a light guide plate by use of the conventional molding apparatus 11; line L3 indicates the temperature of the movable mold 24B in forming a light guide plate by use of the molding apparatus 61 of the present invention; and line L4 indicates the temperature of the transfer plate 34 in forming a light guide plate by use of the molding apparatus 61 of the present invention.

According to the present embodiment, in molding a light guide plate by use of the molding apparatus 61, the temperature of the movable mold 24B at the time of start of molding is set about 40° C. lower than that of the movable mold 13 at the time of start of molding of a light guide plate by use of the conventional molding apparatus 11. The temperature of the movable mold 24B is 50° C. or more lower than the glass transition temperature of the resin 30 to be subjected to molding. In this case, the temperature of the molten resin 30 is 290° C.

First, in the conventional molding apparatus 11, when the resin 30 is charged into the cavities C1, C2 of the molding apparatus 11, the temperatures of the movable mold 13 and the transfer plate 34 rise sharply, since the temperature of the resin 30 is 290° C. However, since the movable mold 13 removes a lot of heat, temperature T1 of the transfer plate 34 at time (timing) tp1 when transfer is completed is about 120° C.

At this time, temperature T2 of the movable mold 13 is slightly in excess of 130° C.

Therefore, the resin 30 is cooled sharply from a temperature of 290° C. by time tp1 when transfer is completed. Thus, a skin layer is apt to be formed, and a formed skin layer is apt to grow.

Meanwhile, in the conventional molding apparatus 11, pits and projections each having a submicron size are formed on a light guide plate. The pits and projections must be formed such that the depth of the pits is about half the size of an opening thereof. The depth is very small as compared with the thickness of a skin layer.

Accordingly, in forming a light guide plate by use of the conventional molding apparatus 11, the resin 30 which has shifted to a solidified state is crushed and plastically deformed through application of a large mold-clamping force by a mold-clamping apparatus, so as to cause the resin 30 to follow the pits and projections on the transfer plate 34. As a result, a pattern on the transfer surface of the transfer plate 34 is apt to deteriorate.

Transfer is completed after elapse of about 1.2 second; i.e., at time tp1. Subsequently, the temperatures of the transfer plate 34 and the movable mold 13 lower gradually along substantially parallel, respective lowering curves. Since the temperature of the molding apparatus 11 is set rather high, the temperature lowers very slowly. Thus, a time of 12 seconds or more has elapsed until time tp2 when mold-opening is performed; a time of near 16 seconds has elapsed until time tp3 when a light guide plate is ejected; and, eventually, a time of 17.2 seconds or more has elapsed until time tp4 when mold closing of the molding apparatus 11 is performed, whereby the next cycle of molding becomes ready to start.

By contrast, in the molding apparatus 61 of the present invention, even though the temperature of the molding apparatus 61 at the time of start of molding is set near 40° C. lower than that of the conventional molding apparatus 11, the presence of the thermal insulation layer 40 restricts dissipation of thermal energy of the resin 30 toward the movable mold 24B. Thus, at transfer completion time t1 ($\cong$tp1), the temperature of the transfer plate 34 is raised to about the same level (about 120° C.) as that of the conventional molding apparatus 11. The temperature rise of the transfer plate 34 is slightly gentler than that of the transfer plate 34 used in the conventional molding apparatus 11. However, the temperature of the movable mold 24B rises to near 160° C. at a stretch.

As in the case of use of the conventional molding apparatus 11, transfer is completed after elapse of about 1.2 second; i.e., at time t1 ($\cong$tp1). However, in the case of use of the molding apparatus 61 of the present invention, at the initial stage of charge before completion of transfer, the resin 30 is maintained rather high in temperature and thus maintains its fluidity. Thus, as compared with the case of use of the conventional molding apparatus 11, the growth of a skin layer is restricted, and the degree of solidification is lowered. As a result, the resin 30 can readily follow pits and projections on the transfer surface of the transfer plate 34.

Therefore, in the present embodiment, a mold-clamping force for plastically deforming resin in the vicinity of the transfer surface; i.e., a skin layer, can be reduced. Thus, not only can the overall size of the injection molding machine including the mold-clamping apparatus be reduced, but also costs can be reduced. Also, the accuracy of transfer from the transfer surface of the transfer plate 34 can be enhanced. When a mold-clamping force equivalent to that generated in use of the conventional molding apparatus 11 is generated, the accuracy of transfer from the transfer surface of the transfer plate 34 can be enhanced.

After completion of transfer, the temperatures of the transfer plate 34 and the movable mold 24B lower. Since the temperature of the molding apparatus 61 is set rather low, the temperatures of the transfer plate 34 and the movable mold 24B decrease more quickly.

Thus, only a time of about 6.4 seconds elapses until time t2 when mold-opening is performed; only a time of about 9.2 seconds elapses until time t3 when a light guide plate is ejected; and, eventually, only a time of about 9.6 seconds to 11.6 seconds elapses until time t4 when mold closing is performed, whereby the next cycle of molding becomes ready to start. The temperature of the transfer plate 34 at time t2 when mold opening is performed is 34° C. lower than that of the transfer plate 34, at time tp2, used in the conventional molding apparatus 11.

As mentioned above, in the present embodiment, the thermal insulation layer 40 is disposed between the movable mold 24B and the transfer plate 34, thereby restricting dissipation of thermal energy of the resin 30 toward the movable mold 24B. This can restrict the formation of a skin layer, which could otherwise result from a sharp drop in temperature of the resin 30. As a result, transfer accuracy can be enhanced.

Since a mold-clamping force for plastically deforming a skin layer can be reduced, not only can the size of the injection molding machine be reduced, but also the durability of the transfer plate 34 can be enhanced.

Since the temperature of the molding apparatus 61 can be set low to an extent corresponding to the enhancement of transfer accuracy, the speeds at which the temperatures of the transfer plate 34 and the movable mold 24B drop can be increased. Therefore, a molding cycle can be sufficiently shortened.

Next, a second embodiment of the present invention for forming a disk substrate will be described. Like structural elements of the first and second embodiments are denoted by like reference numerals. For the effects that the second embodiment yields through employment of structural elements similar to those of the first embodiment, the effects that the first embodiment yields are applied accordingly.

Figure 8:
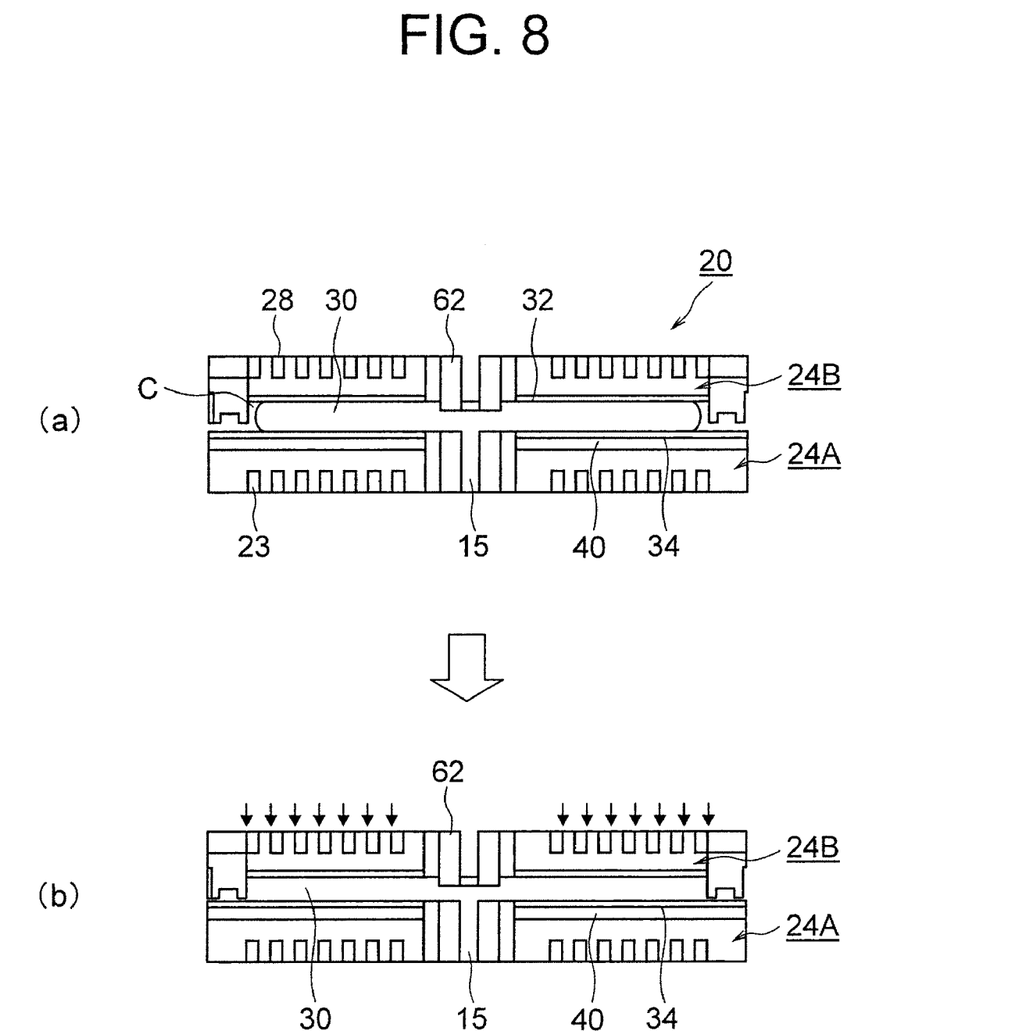
FIG. 8 is a pair of sectional views showing a resin molding method in a second embodiment of the present invention.

FIG. 8 is a pair of sectional views showing a resin molding method in the second embodiment of the present invention, wherein (a) is a view showing a state in which the resin 30, which serves as a molding material, is charged into a cavity C, and (b) is a view showing a state in which mold clamping has been performed.

In FIG. 8, reference numeral 20 denotes a molding apparatus, which serves as a resin molding apparatus for molding an article such as a disk substrate; reference numeral 24A denotes a stationary mold (stationary lower mold), which serves as a first mold member and as a first mold; and reference numeral 24B denotes a movable mold (movable upper mold), which serves as a second mold member and as a second mold, disposed in a manner capable of advancing and retreating in relation to the stationary mold 24A. By means of an unillustrated mold-clamping apparatus (press mechanism), the movable mold 24B is advanced; i.e., mold closing is performed; the movable mold 24B is brought into contact with the stationary mold 24A; i.e., mold clamping is performed, thereby forming the cavity C having a circular shape between the stationary mold 24A and the movable mold 24B; and the movable mold 24B is retreated from the stationary mold 24A; i.e., mold opening is performed.

Reference numeral 15 denotes a sprue formed in the stationary mold 24A. Communication is established between the tip end of the sprue 15 and the cavity C. Reference numeral 62 denotes a cut punch disposed in a manner capable of advancing and retreating in relation to the movable mold 24B. The advancing cut punch 62 can cut a hole in the resin 30 charged into the cavity C.

As in the case of the first embodiment, the thermal insulation layer 40 having a honeycomb structure is formed on a surface of the stationary mold 24A which is located within the cavity C and faces the movable mold 24B. The transfer plate 34 is attached to a surface of the thermal insulation layer 40 which faces the movable mold 24B. In the present embodiment, a stamper is used as the transfer plate 34. The transfer plate 34 has a transfer surface which faces the movable mold 24B and on which fine pits and projections are formed in a predetermined pattern.

The temperature-regulating channels 23 are formed in the stationary mold 24A and the movable mold 24B. A temperature-regulating medium; for example, water, is run through the temperature-regulating channels 23 so as to cool the molding apparatus 20 and the resin 30 within the cavity C.

The resin 30 in the cavity C is cooled, by the above-mentioned water, to set. At this time, the pattern on the transfer surface of the transfer plate 34 is transferred onto the resin 30. Subsequently, the cut punch 62 is advanced so as to cut a hole. Then, mold opening is performed, thereby yielding a disk substrate.

In the present embodiment, a disk substrate is formed. Thus, the resin charged into the cavity C is spread into the form of a thin disk substrate. Accordingly, after transfer, the molding apparatus 20 whose temperature is set low rapidly removes thermal energy from the resin, so that the disk substrate can be cooled favorably. As a result, a molding cycle can be shortened.

Notably, by means of slightly lowering the thermal insulation effect of the thermal insulation layer 40 and slightly increasing the temperature of the molding apparatus 20 at the time of start of molding, intermediate characteristics can be imparted to the transfer plate 34 and the movable mold 24B.

Next, the operation of the molding apparatus 20 having the above-mentioned configuration will be described.

Figure 9:
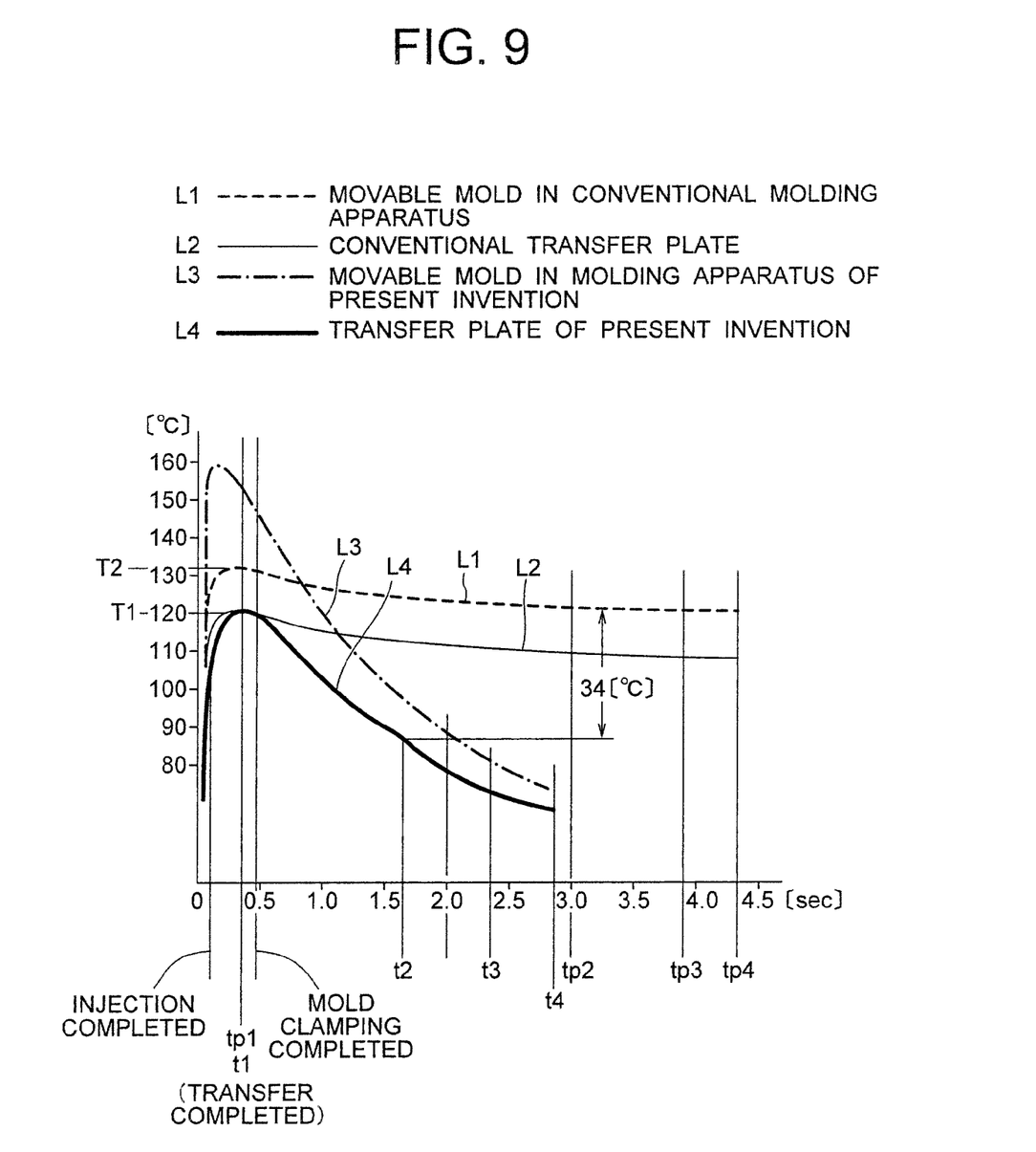
FIG. 9 is a graph showing characteristics of a molding apparatus in the second embodiment of the present invention.

FIG. 9 is a graph showing characteristics of a molding apparatus in the second embodiment of the present invention. In FIG. 9, time is plotted along the horizontal axis, and the temperature of the molding apparatus 20 is plotted along the vertical axis.

In FIG. 9, line L1 indicates the temperature of a movable mold in forming a disk substrate by use of a conventional molding apparatus for molding a disk; line L2 indicates the temperature of a transfer plate (stamper) in forming a disk substrate by use of the conventional molding apparatus for molding a disk; line L3 indicates the temperature of the movable mold 24B in forming a disk substrate by use of the molding apparatus 20 of the present invention; and line L4 indicates the temperature of the transfer plate 34 in forming a disk substrate by use of the molding apparatus 20 of the present invention.

According to the present embodiment, in molding a disk substrate by use of the molding apparatus 20, the temperature of the movable mold 24B at the time of start of molding is set about 40° C. lower than that of the movable mold at the time of start of molding of a disk substrate by use of the conventional molding apparatus for molding a disk. The temperature of the movable mold 24B is 50° C. or more lower than the glass transition temperature of the resin 30 to be subjected to molding. In this case, the temperature of the molten resin 30 is 290° C.

First, in the conventional molding apparatus for molding a disk, when the resin is charged into the cavity of the molding apparatus, the temperatures of the movable mold and the transfer plate rise sharply, since the temperature of the resin is 290° C. However, since the movable mold removes a lot of heat, temperature T1 of the transfer plate at time (timing) tp1 when transfer is completed is about 120° C.

At this time, temperature T2 of the movable mold is slightly in excess of 130° C.

Therefore, the resin is cooled sharply from a temperature of 290° C. by time tp1 when transfer is completed. Thus, a skin layer is apt to be formed, and a formed skin layer is apt to grow.

Meanwhile, in the conventional molding apparatus for molding a disk, pits and projections each having a submicron size are formed on a disk substrate. The pits and projections must be formed such that the depth of the pits is about half the size of an opening thereof. The depth is very small as compared with the thickness of a skin layer.

Accordingly, in forming a disk substrate by use of the conventional molding apparatus for molding a disk, the resin which has shifted to a solidified state is crushed and plastically deformed through application of a large mold-clamping force by a mold-clamping apparatus, so as to cause the resin to follow the pits and projections on the transfer plate. As a result, a pattern on the transfer surface of the transfer plate is apt to deteriorate.

Transfer is completed after elapse of about 0.3 second; i.e., at time tp1. Subsequently, the temperatures of the transfer plate and the movable mold lower gradually along substantially parallel, respective lowering curves. Since the temperature of the conventional molding apparatus is set rather high, the temperature lowers very slowly. Thus, a time of 3 seconds or more has elapsed until time tp2 when mold-opening is performed; a time of near 4 seconds has elapsed until time tp3 when a disk substrate is ejected; and, eventually, a time of 4.3 seconds or more has elapsed until time tp4 when mold closing of the conventional molding apparatus for molding a disk is performed, whereby the next cycle of molding becomes ready to start.

By contrast, in the molding apparatus 20 of the present invention, even though the temperature of the molding apparatus 20 at the time of start of molding is set near 40° C. lower than that of the conventional molding apparatus for molding a disk, the presence of the thermal insulation layer 40 restricts dissipation of thermal energy of the resin 30 toward the stationary mold 24A. Thus, at transfer completion time t1 ($\cong$tp1), the temperature of the transfer plate 34 is raised to about the same level (about 120° C.) as that of the conventional molding apparatus for molding a disk. The temperature rise of the transfer plate 34 is slightly gentler than that of the transfer plate 34 used in the conventional molding apparatus for molding a disk. However, the temperature of the movable mold 24B rises to near 160° C. at a stretch.

As in the case of use of the conventional molding apparatus for molding a disk, transfer is completed after elapse of about 0.3 second; i.e., at time t1 ($\cong$tp1). However, in the case of use of the molding apparatus 20 of the present invention, at the initial stage of charge before completion of transfer, the resin 30 is maintained rather high in temperature and thus maintains its fluidity. Thus, as compared with the case of use of the conventional molding apparatus for molding a disk, the growth of a skin layer is restricted, and the degree of solidification is lowered. As a result, the resin 30 can readily follow pits and projections on the transfer surface of the transfer plate 34.

Therefore, in the present embodiment, a mold-clamping force for plastically deforming resin in the vicinity of the transfer surface; i.e., a skin layer, can be reduced. Thus, not only can the overall size of the injection molding machine including the mold-clamping apparatus be reduced, but also costs can be reduced. Also, the accuracy of transfer from the transfer surface of the transfer plate 34 can be enhanced. When a mold-clamping force equivalent to that generated in use of the conventional molding apparatus for molding a disk is generated, the accuracy of transfer from the transfer surface of the transfer plate 34 can be enhanced.

After completion of transfer, the temperatures of the transfer plate 34 and the movable mold 24B lower. Since the temperature of the molding apparatus 20 is set rather low, the temperatures of the transfer plate 34 and the movable mold 24B decrease more quickly.

Thus, only a time of about 1.6 second elapses until time t2 when mold-opening is performed; only a time of about 2.3 seconds elapses until time t3 when a disk substrate is ejected; and, eventually, only a time of about 2.4 seconds to 2.9 seconds elapses until time t4 when mold closing is performed, whereby the next cycle of molding becomes ready to start. The temperature of the transfer plate 34 at time t2 when mold opening is performed is 34° C. lower than that of the transfer plate 34, at time tp2, used in the conventional molding apparatus for molding a disk.

As mentioned above, in the present embodiment, the thermal insulation layer 40 is disposed between the stationary mold 24A and the transfer plate 34, thereby restricting dissipation of thermal energy of the resin 30 toward the movable mold 24B. This can restrict the formation of a skin layer, which could otherwise result from a sharp drop in temperature of the resin 30. As a result, transfer accuracy can be enhanced.

Since a mold-clamping force for plastically deforming a skin layer can be reduced, not only can the size of the injection molding machine be reduced, but also the durability of the transfer plate 34 can be enhanced.

Since the temperature of the molding apparatus 20 can be set low to an extent corresponding to the enhancement of transfer accuracy, the speeds at which the temperatures of the transfer plate 34 and the movable mold 24B drop can be increased. Therefore, a molding cycle can be sufficiently shortened.

In the first and second embodiments, the honeycomb structure is formed on the transfer plate 34 or on either the stationary mold 24A or the movable mold 24B. However, the honeycomb structure can be formed by other methods.

A third embodiment of the present invention in which the honeycomb structure is formed by another method will next be described.

Figure 10:
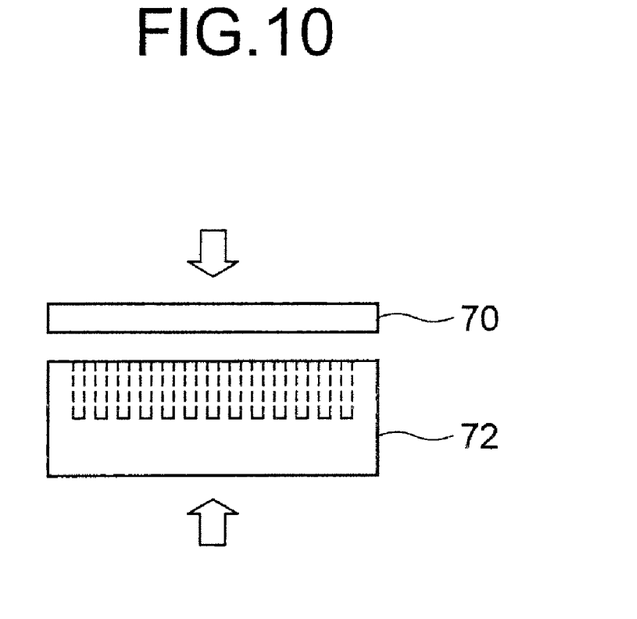
FIG. 10 is a first view showing a method for forming a thermal insulation layer in a third embodiment of the present invention.
Figure 11:
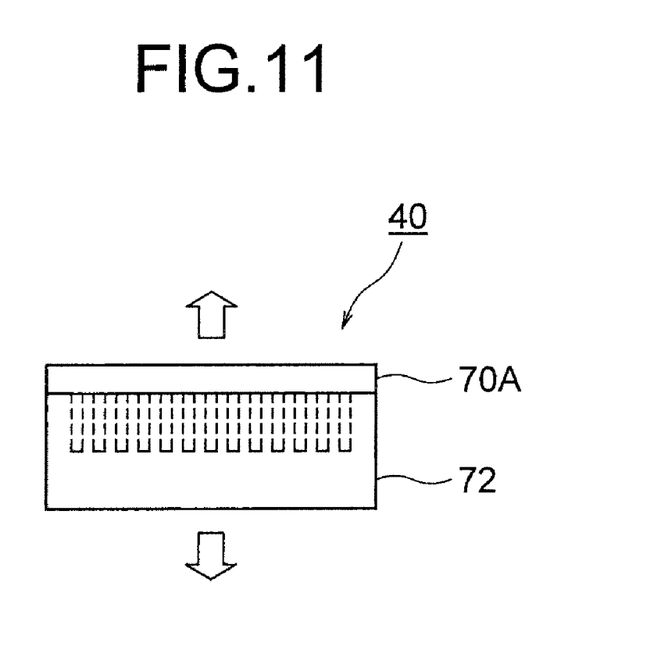
FIG. 11 is a second view showing the method for forming a thermal insulation layer in the third embodiment of the present invention.

FIG. 10 is a first view showing a method for forming a thermal insulation layer in the third embodiment of the present invention. FIG. 11 is a second view showing the method for forming a thermal insulation layer in the third embodiment of the present invention.

For example, in metal injection molding, difficulty may be encountered in charging a green substance which contains metal powder, into deep grooves each having a width of about 10 µm. In such a case, for example, as shown in FIGS. 10 and 11, a thin plate 70 which contains metal powder is prepared beforehand by metal injection molding. A negative-honeycomb transfer plate 72 (used to form the thermal insulation layer 40) having a negative honeycomb structure (a structure having acicular protrusions) is pressed against the thin plate 70. In this state, the thin plate 70 and the negative-honeycomb transfer plate 72 are pressed against each other under pressure generated by an unillustrated press, whereby the negative honeycomb structure is transferred onto the thin plate 70. Subsequently, the negative-honeycomb transfer plate 72 is separated from the thin plate 70, thereby yielding a thin plate 70A, which is a negative structure having a transferred honeycomb structure as shown in FIG. 11. The thin plate 70A can be disposed as a thermal insulation layer between the transfer plate 34 and either the stationary mold 24A or the movable mold 24B.

Next, a fourth embodiment of the present invention in which a honeycomb structure is formed by still another method will be described.

Figure 12:
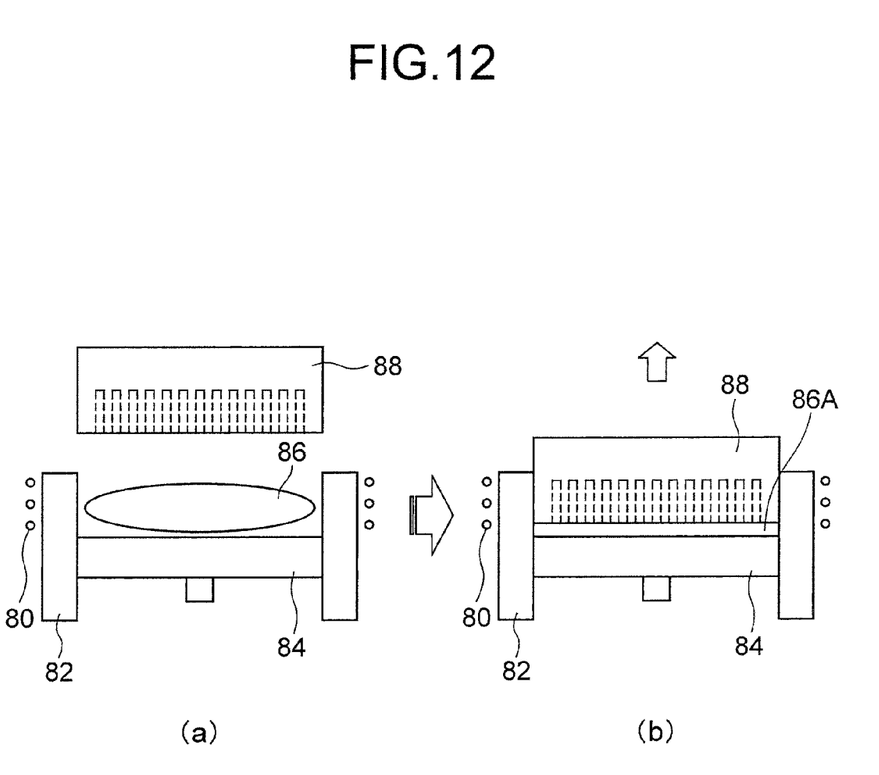
FIG. 12 is a pair of views showing a method for forming a thermal insulation layer in a fourth embodiment of the present invention.

FIG. 12 is a pair of views showing a method for forming a thermal insulation layer in the fourth embodiment of the present invention, wherein (a) is a view showing a state before transfer of a honeycomb structure, and (b) is a view showing a state after transfer of the honeycomb structure.

This method uses an amorphous metal (so-called "metal glass") having high fluidity and wear resistance. As shown in FIG. 12(a), an amorphous metal 86 is placed on a mold mirror plate 84 which is heated in a sleeve 82 by use of a heating coil 80, which serves as a heating element. Press-forming is performed in such a manner that a negative-honeycomb transfer plate 88 (used to form a thermal insulation layer) having a negative honeycomb structure is pressed against the amorphous metal 86 as shown in FIG. 12(b), whereby the negative honeycomb structure can be transferred onto the amorphous metal 86. Subsequently, the negative-honeycomb transfer plate 88 is separated from the amorphous metal 86, thereby yielding an amorphous metal layer 86A, which is a negative structure having a transferred honeycomb structure. The mold mirror plate 84 on which the amorphous metal layer 86A is formed as a thermal insulation layer can be used as a chase which partially constitutes the molding apparatus 20, and be disposed between the transfer plate 34 and either the stationary mold 24A or the movable mold 24B.

The present invention is not limited to the above-described embodiments. Numerous modifications and variations of the present invention are possible in light of the spirit of the present invention, and they are not excluded from the scope of the present invention.

INDUSTRIAL APPLICABILITY

The present invention can be applied to a molding apparatus of an injection molding machine.

I claim:

1. A resin molding apparatus comprising:
   (a) a first mold;
   (b) a second mold disposed in opposition to the first mold;
   (c) a transfer plate attached to one of the first and second molds such that a transfer surface bearing a pattern of pits and projections faces a cavity; and
   (d) a thermal insulation layer formed of metal glass and disposed between the transfer plate and the one of the first and second molds.

2. A resin molding apparatus according to claim 1, wherein the thermal insulation layer is formed through process of pressing a plate comprising a negative structure against the metal glass.

3. A resin molding apparatus according to claim 2, wherein the thermal insulation layer is formed through process of transferring said negative structure of the plate onto the metal glass heated by use of a heating element.

4. A resin molding apparatus according to claim 3, wherein the thermal insulation layer is formed through process of transferring said negative structure of the plate onto the metal glass placed on a mold mirror plate which constitutes the one of the first and second mold.

5. A resin molding apparatus according to claim 1, wherein the thermal insulation layer has a honeycomb structure.

* * * * *